J. J. VOORHEES, Jr.
HOSE.
APPLICATION FILED NOV. 15, 1912.
1,158,595.                                             Patented Nov. 2, 1915.
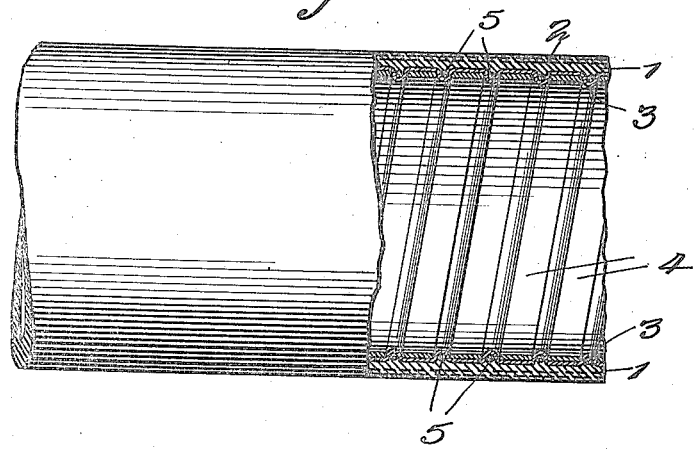
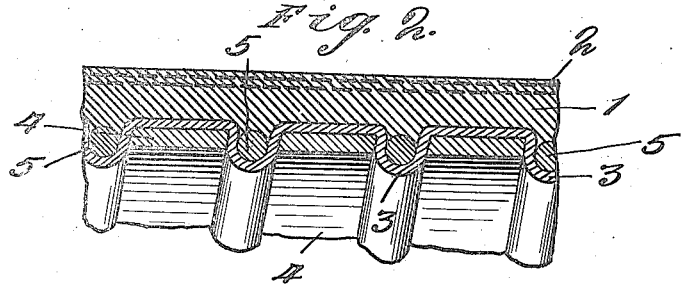
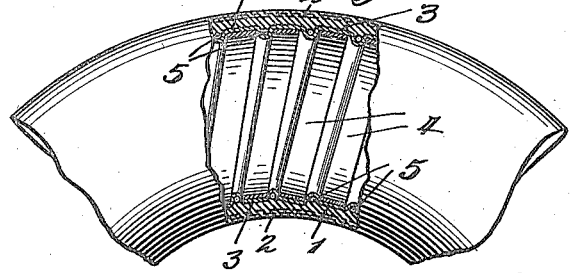

UNITED STATES PATENT OFFICE.

JOHN J. VOORHEES, JR., OF JERSEY CITY, NEW JERSEY.

HOSE.

1,158,595.   Specification of Letters Patent.   Patented Nov. 2, 1915.

Application filed November 15, 1912. Serial No. 731,516.

*To all whom it may concern:*

Be it known that I, JOHN J. VOORHEES, Jr., a citizen of the United States, residing in Jersey City, county of Hudson, and State of New Jersey, have invented certain new and useful Improvements in Hose, of which the following, taken in connection with the accompanying sheet of drawings, forms a full, clear, and concise description.

My invention relates to certain new and useful improvements in hose, the object being to provide an article of this kind which will be flexible and convenient for use, while at the same time rendering it durable and able to withstand long and severe service conditions.

My invention may be applied to various uses, but one form of application wherein it is especially useful is illustrated in the accompanying drawings, and which consists of an armored hose such as is used for many purposes in the arts.

In these drawings, illustrating one form of my invention, Figure 1 is a side elevation of a piece of hose shown partly in section. Fig. 2 is an enlarged cross-sectional view of the wall of the hose; and Fig. 3 is a view, partly in section of a piece of hose showing it bent and subject to the strains which ordinarily are extremely injurious to an article of this character and construction.

In the drawings, the numeral 1 indicates the tubing proper, which may be of rubber or other suitable flexible material.

The numeral 2 indicates diagrammatically layers of reinforcing fabric which may or may not be used.

The inner side of the tube comprises a lining 3, of fabric, and a reinforcing element 4 (which in the form illustrated consists of a spirally wound flat metal band), is provided to assist in maintaining the true form of the tube, and also forms a reinforcing and wear-resisting element which greatly adds to the strength and durability of the hose. Hose of this general character have been used for some time but have only been partially satisfactory, largely by reason of the fact that when the hose is bent the spirally-arranged reinforcing member is apt to be displaced and slip and thereby cause cutting or injury to the tubing and also a permanent distortion of the hose. I have therefore found it extremely desirable to anchor each convolution of the reinforcing element so that they will not become displaced under any ordinary service conditions to which the hose is subjected, no matter how much or in what manner it may be bent, and the preferable way I have found is by providing projections from the inner surface of the tube substantially equal in width to the space between the convolutions, and in the form illustrated these projections are produced by means of cords 5, which are wound spirally around and which fill the interstices between the convolutions and thus prevent their lateral movement.

One satisfactory method of carrying out my invention is to use the spiral member as a mandrel, cover this with a fabric lining, then wind the cord 5 spirally around the fabric, forcing it between the convolutions of the metal, as shown in Fig. 2. After this the rubber tube is formed upon the cord and fabric and the tube may be vulcanized, coated, or treated in any way desired.

It is obvious that many modifications and changes may be made in details of construction and arrangement without departing from the spirit of my invention, and also other methods of construction may be employed, and I do not mean to limit myself to those specifically shown and described.

Having thus described my invention what I claim new herein and desire to secure by Letters Patent is:—

1. A hose having a smooth outer surface comprising a tube of rubber, a fabric lining for the interior of said tube, a reinforcing element of flat metal spirally wound within said tube and lying upon the inner surface of said fabric, and means for anchoring said reinforcing element within said tube, said means consisting of a cord spirally wound about the outer surface of said fabric contiguous to the spaces between the convolutions of the reinforcing element, whereby a plurality of inwardly projecting ribs are formed within the spaces between the convolutions in the reinforcing element, the edges of the flat metal abutting thereagainst.

2. A hose having a smooth outer surface comprising a tube of rubber, a fabric lining positioned therewithin, a reinforcing element of flat metal spirally wound and arranged within said tube, the convolutions of the reinforcing element bearing upon the inner face of said fabric, and means for anchoring the reinforcing element within said tube, said anchoring means comprising a cord spirally wound about the outer surface of said fabric adjacent to the spaces between the convolutions of the reinforcing element, whereby a plurality of inwardly directed protective spiral ribs are formed by the coöperation of said fabric and said anchoring cord, said ribs projecting through the spaces between the convolutions of the reinforcing element and extending a considerable distance inwardly beyond the plane of the inner faces of the convolutions of the reinforcing element, the reinforcing element and fabric being thereby securely locked against relative longitudinal movement.

3. A hose formed of a strip of spirally wound flat metal, having a tube of fabric disposed thereupon, a cord spirally wound upon the outer surface of said fabric to form ribs projecting inwardly in the interstices between the convolutions of said flat metal strip, and a tube of rubber applied to and lying in close contact with the outer surface of said fabric, the formation of said ribs serving to hold the respective convolutions of the metal against movement relatively to each other and at all times maintaining the metal out of contact with the rubber and preventing injury thereof.

In witness whereof I have hereunto set my hand in the presence of two subscribing witnesses.

JOHN J. VOORHEES, Jr.

Witnesses:
CHAS. LYON RUSSELL,
WM. C. DUNN.